Oct. 6, 1925.

J. MAKANT 1,556,450

COMBINATION WHEEL

Filed July 8, 1924

WITNESSES
H. T. Walker
P. H. Pattison

INVENTOR
Joseph Makant
BY
ATTORNEYS

Oct. 6, 1925.
J. MAKANT
1,556,450
COMBINATION WHEEL
Filed July 8, 1924 2 Sheets-Sheet 2
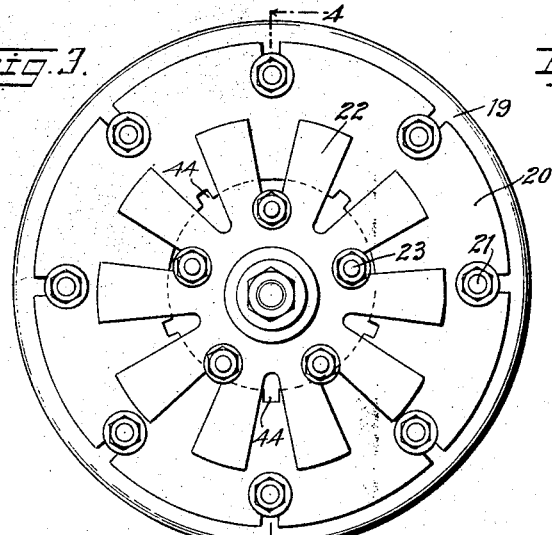
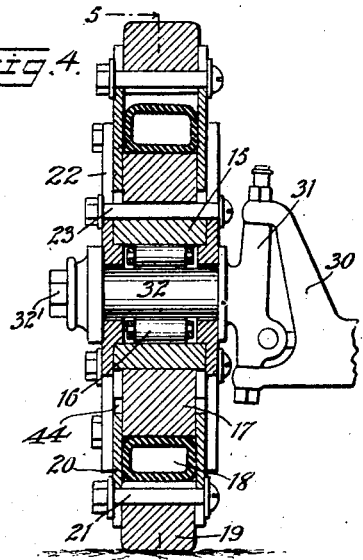
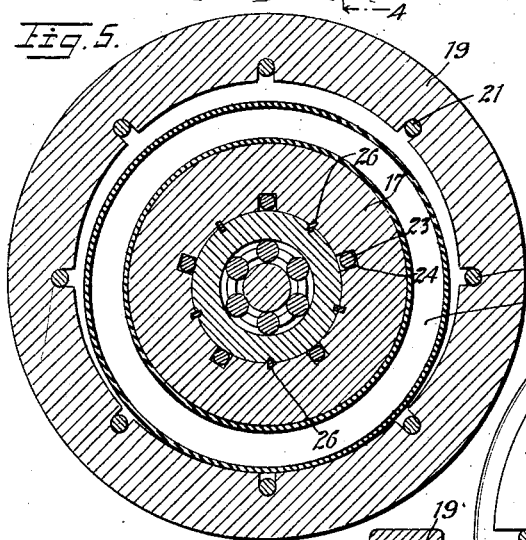
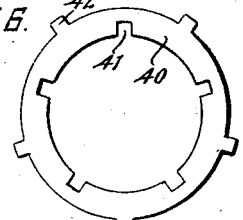
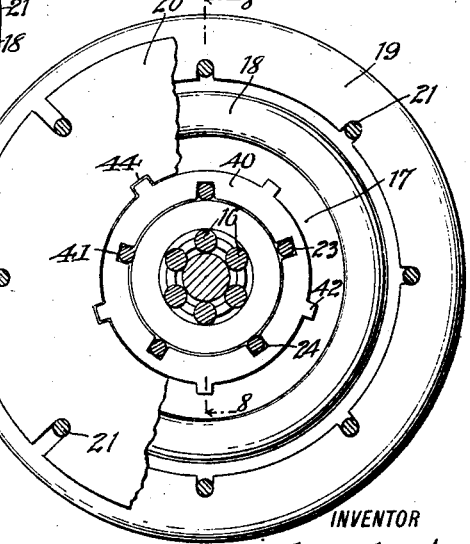
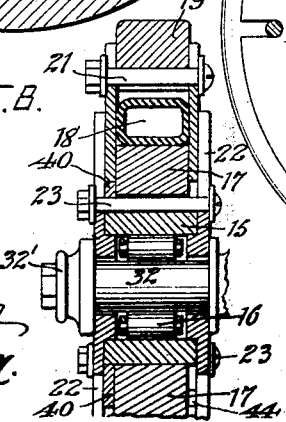
WITNESSES
H. J. Walker
P. H. Pattison
INVENTOR
Joseph Makant
BY
ATTORNEYS Patented Oct. 6, 1925.

1,556,450

UNITED STATES PATENT OFFICE.

JOSEPH MAKANT, OF WEST HAVERSTRAW, NEW YORK.

COMBINATION WHEEL.

Application filed July 8, 1924. Serial No. 724,824.

*To all whom it may concern:*

Be it known that I, JOSEPH MAKANT, a citizen of the United States, and a resident of West Haverstraw, in the county of Rockland and State of New York, have invented a new and useful Improvement in Combination Wheels, of which the following is a full, clear, and exact description.

The present invention relates to new and useful improvements in wheels, and it pertains more particularly to a wheel of the combined cushion and pneumatic type.

It is one of the primary objects of the invention to provide a new and improved form of wheel in which the road-engaging surface is in the form of a cushion tire.

It is a further object of the invention to provide a new and improved wheel which may be readily disassembled for renewal and repair of parts.

It is a further object of the invention to provide a wheel of such a character that the load of the vehicle is supported upon a pneumatic tube, the carrying member of which is eccentrically disposed with respect to the member in which it is mounted.

It is a further object of the invention to construct the wheel in such a manner that should the pneumatic tube be damaged, the tube-carrying member may be positioned concentrically with respect to the outer wheel in order that the wheel may be used until repairs can be made.

With the above and other objects in view, reference is had to the accompanying drawings, in which—

Fig. 3 is a view in elevation of the wheel when used as a front or steering wheel;

Fig. 4 is a vertical sectional view taken on the line 4—4 of Fig. 3;

Fig. 5 is a vertical sectional view taken at right angles to Fig. 4 and on the line 5—5 thereof;

Fig. 6 is a detail view in elevation of the locking member used to mount the two wheel members concentrically of each other;

Fig. 7 is a view partly in section and partly in elevation showing the two members of the wheel in concentric relation;

Fig. 8 is a detail sectional view taken on the line 8—8 of Fig. 7 with the spiders applied.

Figure 1:
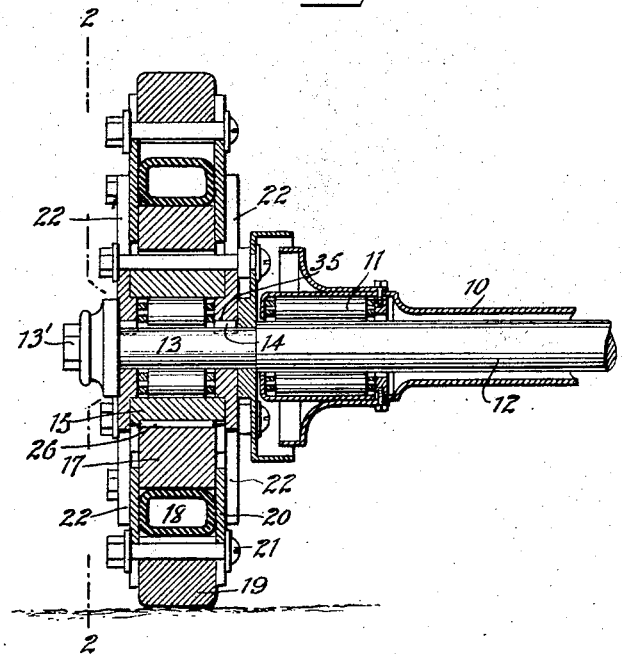
Figure 1 is a vertical sectional view of a wheel constructed in accordance with the present invention, said wheel being used as a driving wheel and the section being taken on the line 1—1 of Fig. 2.
Figure 2:
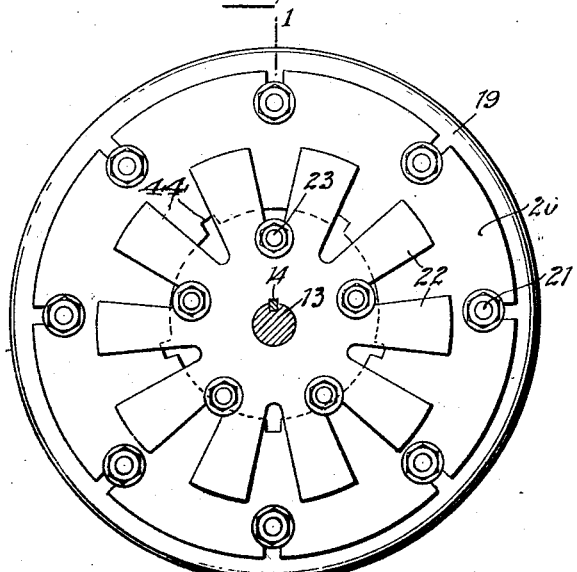
Fig. 2 is a view showing the wheel in side elevation with the axle shown in section, the section being taken on the line 2—2 of Fig. 1.

Referring again to the drawings and more particularly to Figs. 1 and 2, the reference numeral 10 designates a rear axle housing provided with a roller bearing 11 in the ordinary manner. Passing through and supported by the roller bearing 11, there is an axle shaft 12, having a projecting end 13 and carrying a nut 13', by means of which the wheel is secured to the axle. The wheel is adapted to be mounted upon the projecting end 13 of the axle shaft 12 and is keyed thereto by means of a key 14.

Referring to Figs. 3 and 4 it will be noted that the wheel comprises a hub member 15 interior of which there is a roller bearing 16, and surrounding the hub member 15 there is a wheel member 17, which wheel member 17 carries a pneumatic tube 18. The reference numeral 19 designates a cushion or solid tire, which is suitably clamped between side plates 20 by means of bolts or the like, 21.

After the wheel has been thus far assembled, spiders or the like, 22, are secured in place by means of bolts 23, which bolts 23 pass through notches 24 in the inner wheel member 17, as shown in Figs. 4 and 5.

As more clearly shown in Fig. 5, the hub member 15 is locked to the wheel member 17 by means of keys or the like, 26, of which there are five shown in the present drawings.

In Fig. 4 the reference numeral 30 designates one end of a front axle and a steering knuckle 31 is mounted therein in the usual manner, said steering knuckle 31 having a wheel spindle 32 which carries a nut 32', by means of which the wheel is secured thereto.

When the wheel is used on a driving axle, the keys 14 heretofore mentioned as carried by the axle shaft are adapted to engage notches 35 in the spiders 22, it being understood that there is one spider on each side of the wheel, and inasmuch as the spiders are locked to the inner wheel section by means of the bolts 23, it will be noted that the inner wheel section will be driven through the medium of the keys 14 carried by the axle shaft 12.

When, however, the device is used as a front or steering wheel, the spindle 32 is of a size to engage the roller bearing 16, and the wheel is free to rotate upon the spindle through said roller bearing. It is to be understood that in the case of a driving wheel, the roller bearing 16 merely performs the function of a filler and does not perform the function of a roller bearing as commonly employed, the load riding upon the roller bearing 11 heretofore mentioned.

As heretofore stated, the inner and outer wheel members under ordinary operating conditions, are eccentric with relation to each other, and the load is supported by the inner wheel section on the pneumatic tube 18. If the pneumatic tube 18 should become ruptured in any manner, in order to support the load and render the wheel operative, a ring member, such as designated by the reference numeral 40 in Fig. 6, is employed. This ring member 40 has notches 41, and projecting lugs 42, and its use is as follows: Upon deflation of the pneumatic tube 18, the body of the vehicle is lifted in any suitable manner, as by means of a jack, until the inner and outer wheel members are in concentric relation. After this has been done, the ring member 40 is slipped over the hub member 15, and holds said hub member 15 centered with respect to the wheel and also holds the two wheel members in such concentric relation owing to the fact that the ring member 40 surrounds the hub member and its lugs 42 respectively engage notches 44 in the side plates 20. The notches 41 of the ring member receive the bolts 23 heretofore described, and the spiders 22 serve to hold the ring member 40 in position after it has been placed.

From the foregoing it is apparent that the present invention provides a new and improved wheel in which the load is carried upon a pneumatic tube. Furthermore, the invention provides a wheel which is interchangeable and may be used either as a driving wheel or a steering wheel, and still further, the invention provides means for concentrically disposing the parts of a wheel, which under normal operation have eccentric relation to each other.

What is claimed is:

1. In a combination wheel, a hub member, a notched rim surrounding said hub member, a pneumatic tube carried by said notched rim, a plurality of side spiders, and bolts passing through said spiders and through the notches of the rim to secure the parts in operative relation.

2. In a combination wheel, a hub member, a set of removable lugs extending radially outward from said hub member, spiders carried by the hub member, a pneumatic tube supported by and surrounding said hub member, a cushion tire surrounding the pneumatic tube in spaced relationship, side plates carried by said cushion tire, one of the side plates having notches therein to receive the set of lugs and disposed between a spider and adjacent portions of the hub member and pneumatic tube to maintain the pneumatic tube and cushion tire in concentric relationship, the pneumatic tube and cushion tire being permitted to assume an eccentric contacting relationship when the set of lugs is removed.

JOSEPH MAKANT.